Figure 1:
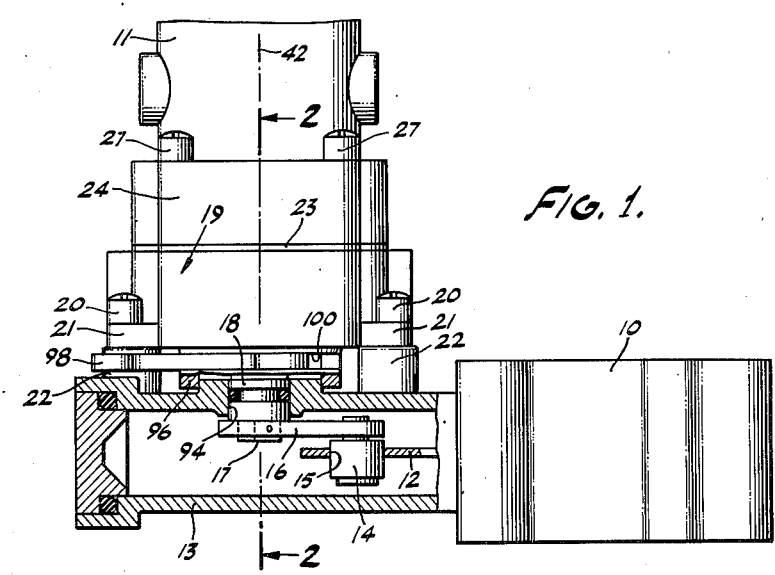

May 14, 1957

W. A. RAY 2,791,920

LOAD OPERATING DEVICE WITH AUTOMATIC
DISCONNECTING MECHANISM

Filed Aug. 16, 1952

2 Sheets-Sheet 1

INVENTOR.
WILLIAM A. RAY
BY
John Flam
ATTORNEY

May 14, 1957

W. A. RAY 2,791,920

LOAD OPERATING DEVICE WITH AUTOMATIC
DISCONNECTING MECHANISM

Filed Aug. 16, 1952

2 Sheets-Sheet 2

INVENTOR.
WILLIAM A. RAY
BY
John Flam
ATTORNEY

United States Patent Office 2,791,920
Patented May 14, 1957

2,791,920

LOAD OPERATING DEVICE WITH AUTOMATIC DISCONNECTING MECHANISM

William A. Ray, North Hollywood, Calif., assignor to General Controls Co., a corporation of California Application August 16, 1952, Serial No. 304,680

4 Claims. (Cl. 74—751)

This invention relates to a motor actuator for operating a load, such as a valve, or circuit controller, or the like.

Devices of this character are often used for remote control. Thus, a circuit controller at a remote station may be operated to cause the motor to move in either direction. Usually, the torque load imposed on the motor unit is quite substantial. For reasons of economy, it is essential to provide as small a motor as possible to operate the load. Accordingly, a high speed motor of low torque is chosen as a design factor, operating through a reduction gearing having an output connected to the load.

For example, a direct current series wound motor may be effectively employed, operating at about 20,000 revolutions per minute. Such speeds, due to the inertia of the moving parts, introduce the problem of stopping the actuator promptly after arrival of the mechanism to a limiting position.

It is one of the objects of this invention to make it possible to unclutch the motor unit from the load promptly upon a definite limit to the motion of the load. In this way, the danger of harm to the apparatus is entirely obviated.

Mechanisms for accomplishing this result are illustrated and described in a copending application of Wilbert C. Buescher, assigned to General Controls Co. filed May 17, 1951, and entitled, Load Operating Device With Automatic Declutching Mechanism. In said application, there is provided a friction clutch device, through which the load is actuated, and which is automatically unclutched upon arrival of the mechanism to a limiting position, but is yet in clutching relation for purposes of reversing the mechanism.

In the present instance, in order to provide an overrunning drive of this character, use is made of a gear transmission similar to that disclosed in said application. Herein, however, the effectiveness of the transmission to impart motion to the load is dependent upon whether an outer gear is prevented from rotation, planetary motion of gear structures associated with the outer gear serving to operate the load.

It is is an object of this invention to provide a transmission that may be conveniently controlled by an accessible external friction band. For this purpose, the friction band determines whether or not the outer gear is held stationary.

It is another object of this invention to provide a mechanism of this character that releases the load upon reaching a limiting position only for that direction of rotation required to reach such limiting position. Accordingly, the mechanism is immediately in condition to operate in the reverse direction, without then performing any other operation upon the friction band.

It is still another object of this invention to improve, in general, load actuating devices of this character.

It is still another object of this invention to provide a novel actuator synchronously associated with the load and having provisions for simultaneously and appropriately deenergizing the motor and positioning the friction band for unclutching the load.

It is still another object of this invention to provide a device of this character that immediately responds to move in the desired direction, and which obviates cycling, or lost motion.

It is still another object of this invention to provide a device of this character that can be easily operated to achieve and intermediate position of the mechanism, and from which the mechanism can be operated immediately in either direction.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Figure 3:
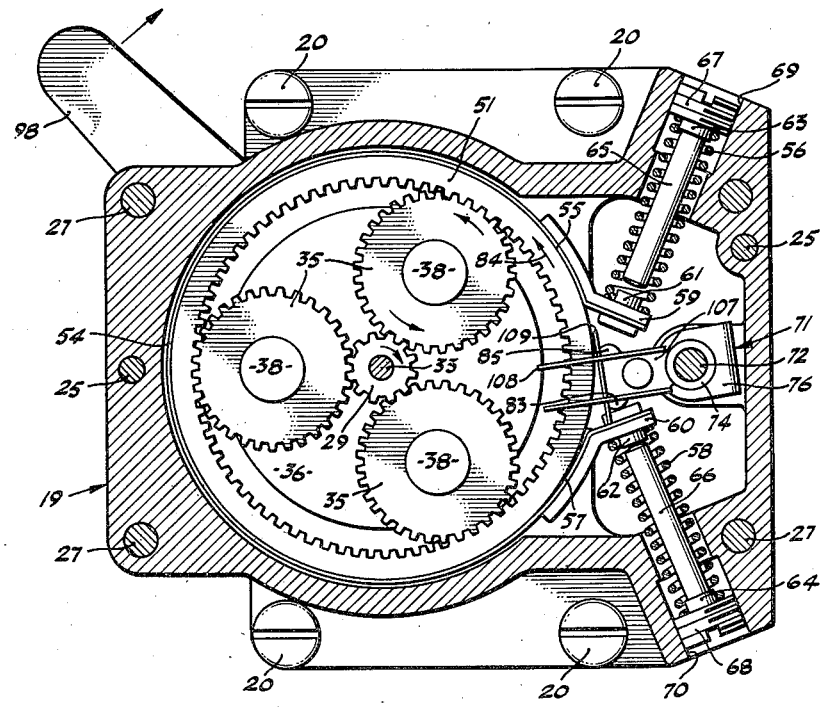
Figure 2:
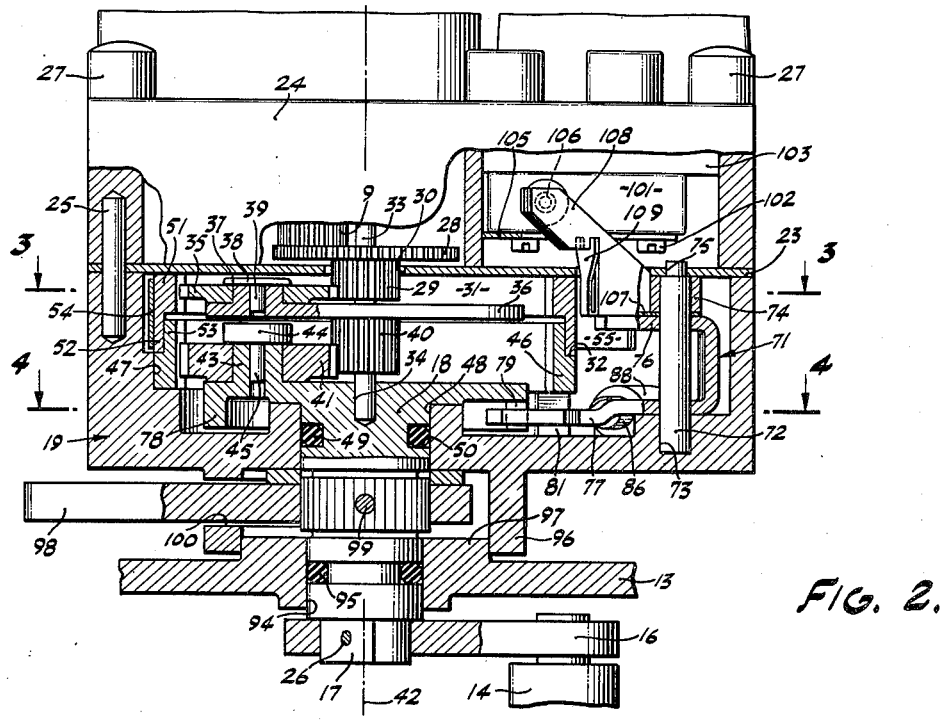
Figure 4:
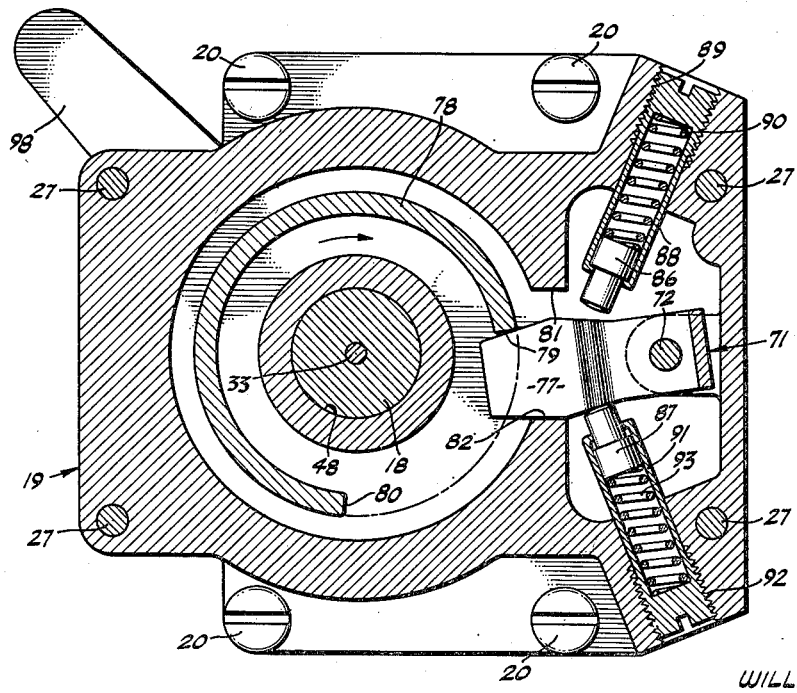

Referring to the drawings:

Figure 1 is a view, partly in section and partly in elevation, of an apparatus incorporating the invention;

Fig. 2 is an enlarged vertical sectional view, taken along the plane corresponding to line 2—2 of Fig. 1; and Figs. 3 and 4 are horizontal sectional views, taken along the planes indicated by lines 3—3 and 4—4 of Fig. 2, illustrating the apparatus in a limiting position.

A gate valve structure, or other controlling mechanism 10 is operated by a small electric motor 11. A movable closure member 12 in a casing 13 is operated by the aid of a roller 14 accommodated in a transverse slot 15 of the closure 12. The roller 14 is carried by a crank 16, which is, in turn, mounted for rotation on a non-circular lower portion 17 of a rotatable driven member 18 projecting into the casing 13 (see, also, Fig. 2). Movement of the crank 16 in either direction through an angle of approximately 90° about the axis 42 of the driven member 18 is sufficient to move the closure between open and closed positions. A cross-pin 26 holds the crank 16 in operative relationship with the non-circular projection 17.

The motor 11 operates the driven member 18 through a gear reduction mechanism. The motor 11 is preferably a series wound direct current motor having a normal speed of about 20,000 revolutions per minute. This motor is reversible, and an appropriate circuit is provided for energizing the motor for either direction of rotation.

The gear mechanism greatly reduces the angular speed of the driven member 18. The angular velocity of the driven member 18 may be of the order of one or two revolutions per second. Only a very small torque by the motor 11 is necessary to supply a sufficient force for opening and closing the gate valve structure 10, since the transmisison, while reducing the speed of the driven member 18, correspondingly increases the torque that it produces. Accordingly, the motor 11 can be extremely small and yet produce a sufficiently high torque to operate the load.

A gear casing 19 is secured to the valve casing 13 by the aid of a plurality of cap screws 20. The cap screws 20 pass through feet 21 integrally formed on the gear casing 19 and into appropriately threaded recesses in bosses 22 formed on the upper wall of the valve casing 13.

The driven member 18 projects into a cylindrical aperture 94 of the valve casing 13. An appropriate O-ring 95, carried by the driven member 18, protects the casing 13 against entry of foreign material. A downwardly extending flange 96, integrally formed on the casing 19, telescopes over a boss 97 integrally formed on the valve casing 13. Intermediate the ends of the driven member 18, there is carried an indicator 98 as by the aid of a cross-pin 99. This indicator 98 projects through a slot 100 in the flange 96.

The casing 19 is open at the top and is closed by removable horizontal wall 23 (Fig. 2), above which the base 24 of the motor 11 is disposed. A plurality of dowel pins 25 ensure accurate registry of the casing 19 and the motor base 24. Screws 27 hold the base portion 24 to the casing 19.

The motor shaft (not shown) is connected through a train of reduction gearing, terminating in a pinion 9, to drive a spur gear 28 that is disposed immediately above the cover 23. A pinion 29 is integrally joined to the gear 28 for rotation therewith. This pinion 29 extends through an appropriate aperture 30 in the cover 23 and into the chamber 31 formed by the casing 19. The chamber 31 accommodates the major portion of the reduction gearing forming the transmission between the motor 11 and the driven member 18.

The pinion gear 29 is mounted for free rotation coaxially with the driven member 18 by the aid of a central pin 33 that is piloted in an axially extending recess 34 in the top of the driven member 18. The pinion 29 meshes with a plurality of planetary gears 35 that are rotatably accommodated on a rotary disc or plate 36, coaxial with gear 28 and pinion 29. For this purpose, there are equiangularly disposed apertured bosses 37 integrally formed on the upper portion of the plate 36. The gears 35 are journaled over these bosses 37 and are held against removal by heads 38 of pins 39 that are accommodated in the apertures of the bosses 37. The heads 38 lie close to the wall 23 and are accordingly maintained in cooperative relationship with the planetary gears 35 and the bosses 37. Three such planetary gears 35 may be provided.

The plate 36 carries a depending pinion 40 integrally joined thereto that operates a second set of planetary gears 41. The plate 36 and the integrally formed pinion 40 have aligned through apertures receiving the pin 33. Accordingly, the plate 36 and pinion 40 are mounted for rotation about an axis 42 of the pin 33 and driven member 18.

The planetary gears 41 are similar to the planetary gears 35. These gears 41 are journaled over equiangularly spaced apertured bosses 43 integrally formed on the upper portion of the driven member 18. Heads 44 of pins 45 engage the planetary gears 41 and hold them in proper relationship with the bosses 43.

The planetary gears 41 engage not only with the pinion 40, but also with internal teeth of a stationary internal gear 46. This stationary gear 46 has an external periphery in firm contact with an internal cylindrical wall 47 of the casing 19. Accordingly, upon rotation of the pinion 40, the gears 41 are caused to rotate in planetary fashion, thereby imparting a rotary movement to the driven member 18 by the aid of the bosses 43 of the driven member 18 upon which the gears 41 are mounted.

The driven member 18 is guided for rotation about its axis 42 by engagement of its peripheral cylindrical surface with a corresponding cylindrical aperture 48 in the lower wall of the casing 19. The driven member projects beyond the gear casing 19 and into the valve casing 13. An O-ring 49, accommodated in a recess 50 of the driven member, ensures proper sealing relationship.

The planetary gears 35 in the upper set are in engagement not only with the pinion 29, from which they are driven, but also with the internal teeth of a ring gear 51. This gear 51 is rotatably mounted on the lower internal ring 46. For so mounting the upper ring gear 51, a depending flange 52 thereof telescopes over a corresponding upwardly extending annular flange 53 of the lower stationary gear 46. A shoulder 32 formed on one of the ring gears 46 abuts the end of the flange 52 of the other ring gear 51, thereby limiting movement of the ring gears 46 and 52 toward each other, and providing a seat for the latter.

Should the external ring 51 be held stationary, as will be explained more fully hereinafter, then upon rotation of the spur gear 28 and pinion 29 by the motor 11 in either direction, the gears 35 are caused to rotate in planetary fashion. Such planetary movement of the gears 35 imparts rotation to the plate 36, pinion 40, lower planetary gears 41, and driven member 18.

If, however, the ring gear 51 is free to rotate, then upon rotation of the pinion 29, the gears 35 need not rotate in planetary fashion (Fig. 3). Instead, the planetary gears 35 may rotate about their own axes, and the outer ring gear 51 may correspondingly rotate. Thus, if the ring 51 is permitted to rotate, no rotation need be imparted to the plate 36 and the pinion 40, especially if a restraint is imposed on the driven member 18. Accordingly, the driven member 18 will be unclutched from the motor 11, but the motor 11 can continue to rotate, imparting in this instance movement to the outer ring 51 instead of to the driven member 18.

A friction band 54, shown most clearly in Fig. 3, is accommodated on the cylindrical periphery of the gear 51. This band 54 determines whether or not the gear 51 is held against rotation and, accordingly, whether or not the member 18 is driven.

The band 54 substantially completely encompassed the gear 51. The clockwisemost end 55 of the band 54 is normally urged further in a clockwise direction by the aid of a compression spring 56. Similarly, the counterclockwisemost end 57 is normally urged further in a counterclockwise direction by the aid of a compression spring 58. For this purpose, the ends 55 and 57 carry brackets 59 and 60, respectively, by the aid of which the springs 56 and 58, respectively, may exert such forces on the band 54. Thus, projections 61 and 62 of the brackets 59 and 60 extend inwardly of the ends of the springs 56 and 58, providing seats therefor and ensuring against the accidental removal of the springs. The other ends of the springs 56 and 58 are accommodated on base portions 63 and 64 of adjustable posts 65 and 66, respectively. These posts 65 and 66 have integrally formed threaded heads 67 and 68 cooperating with correspondingly threaded apertures 69 and 70 of the casing 19. These posts 65 and 66 thus extend into the gear chamber 31, and properly position the springs 56 and 58. Adjustment of the heads 67 and 68 adjusts the force exerted by the springs 56 and 58 upon the ends 55 and 57 of the band 54. The band 54 is thus normally urged in a direction to wrap around the ring gear 51, locking it against rotation. Accordingly, for either direction of movement of the motor 11, the driven member 18 may be accordingly moved, as was described above.

The effectiveness of the springs 56 and 58 to hold the band 54 in engagement with the ring 51 is overcome upon the movement of the driven member 18 to a limiting position. Accordingly, just as soon as the driven member 18 has been rotated to move the valve structure 10 to one limiting position, the motor 11 is uncoupled therefrom by releasing the band 54. Provisions are also made for deenergizing the motor 11 immediately before such limiting position of the driven member 18 is reached. Accordingly, the inertia of the motor 11, being of high speed, can bring the driven member 18 to its ultimate limiting position. As soon as such limiting position is reached, the motor 11 may continue to rotate, but now imparting rotation only to the ring gear 51. Finally the speed of the motor is gradually reduced to zero, and all the mechanism stops rotating. No shock is thus imposed upon the motor, nor is any excess load imparted to the driven member 18 of the valve closure 12.

To achieve this controlling function and to permit the ring gear 51 to rotate upon attaining a limiting position, a U-shaped abutment member 71 is provided. This abutment member is pivotally mounted adjacent the gear structures. For this purpose, a pin 72 passes through apertures of the upper and lower legs 76 and 77 of the abutment member 71. The lower portion of the pin 72 is piloted in a recess 73 of the casing 19, and the upper end passes through a bushing 74 and thence through an aperture 75 of the partition or wall 23.

The lower leg 77 of the abutment 71 cooperates with, and is moved by, an outer depending interrupted flange 78 of the driven member 18. This leg 77 passes between opposed vertical walls 81 and 82 of the casing 19 and is also in the path of movement of a clockwisemost end 79 and a counterclockwisemost end 80 of the interrupted flange 78.

The vertical walls 81 and 82 limit angular movement of the abutment 71 about its pivoted pin 73. Assuming a clockwise direction of rotation of the driven member 18, the lower leg 77 is moved against the wall 82 after engagement of the abutment with the clockwisemost end 79 of the flange 78. Similarly, assuming a counterclockwise direction of movement of the driven member 18, the abutment 77 is moved into engagement with the wall 82 by the counterclockwisemost projection 80 of the flange 78. Before engagement of the counterclockwisemost end 80 with the lower arm 77 of the abutment 71, the driven member 18 must move through an angle of approximately 90°. This motion corresponds to the extent of movement of the driven member 18 necessary to move the valve closure 12 between limiting open and closed positions. The pivoted abutment 71 thus limits the movement of the driven member 18 between its clockwisemost position, illustrated in Fig. 4, and a corresponding counterclockwisemost position.

Upon the driven member 18 reaching either limiting position, the clutch band is caused to be disengaged from the ring gear 51, upon continued movement of the driving gear structures in the same direction. Movement of the pivoted abutment 71, in accordance with the driven member 18, operates the mechanism to achieve this function.

The brackets 59 and 60 for the band 54 are interposed in the paths of movement of projections 85 and 83, integrally formed on the upper arm 76 of the abutment 71. With reference both to Fig. 4 and Fig. 3, the projection 83 engages the bracket 60 immediately before the driven member 18 reaches the clockwisemost position illustrated, through movement of the abutment 71 by the flange end 79. In such position the opposite projection 85 is out of engagement with the bracket 59 such that the clockwisemost end 55 of the band 54 can be acted upon by the spring 56. In a similar manner, the bracket 59 is interposed in the path of movement of the projection 85 and is engaged thereby immediately prior to the driven member 18 reaching the counterclockwise position. In such position the projection 83 of the upper arm 76 is out of engagement with the bracket 60 for the counterclockwisemost end 57 of the band 54. Accordingly, this end 57 may be acted upon by the spring 58. The effect of movement of one of the band ends will be presently described.

Movement of the pinion 29 in a clockwise direction, if the band 54 is prevented from movement, causes the driven member 18 to move to the clockwisemost position illustrated. Similarly, counterclockwise movement of the pinion 29, if the band 54 be prevented from movement, causes the driven member 18 to move to its counterclockwise position. This is apparent from the arrangement of the gear structures.

Outward movement of one of the ends of band 54 permits rotation of the ring 51 in one direction, thereby unclutching the driven member 18. This can best be appreciated in connection with Fig. 3. In the position illustrated, the projection 83 is in engagement with the bracket 60 and has thereby moved the counterclockwisemost end 57 of the band 54 away from the ring 51, by clockwise movement of the pinion 29. The lower arm 77 of the abutment 71, by engagement with the wall 82 and the clockwisemost end 79 of the flange 78, prevents further movement of the driven member 18. The gears 41, which are carried on the driven member 18, are thereby prevented from moving in planetary fashion, and since its ring gear 46 is stationary, the driving pinion 40 therefore is also prevented from rotating. Accordingly, the planetary gears 35, being mounted on the plate 36 integrally formed with the pinion 40, are also prevented from moving in a planetary fashion. The rotation of the gears 35 about their own axes need not be prevented, however, if the ring gear 51 is permitted to rotate. Rotation of the ring gear 51 in a counterclockwise direction is permitted by outward movement of the counterclockwisemost end 57 of the band 54, as illustrated by the arrow 84. This is in fact the direction in which the ring gear 51 is urged to rotate upon clockwise movement of the pinion 29. Such movement of the ring gear 51 urges the clockwisemost end 55 in a counterclockwise or ungripping direction, against the force of the spring 56. Counterclockwise rotation of the ring gear 51 is thus permitted, since the ring gear 51 then tends to uncouple the end 55, and the other end 57 is positively held out of engagement with the ring gear 51 by the projection 83. The pinion 29 and the motor 11 can thus continue to rotate, although the driven member 18 is prevented from rotating, the pinion 29 causing, in this instance, rotation of ring gear 51 and rotation of gears 35 about their own axes.

Let it be assumed that the mechanism is in the position illustrated in Fig. 3 and that the energizing circuit for the motor 11 has been reversed. The driving pinion 29 will now rotate in a counterclockwise direction, urging the ring gear 51 in the opposite, or clockwise direction. Upon such clockwise movement of the ring gear 51, the clockwisemost end 55 is urged further in its clockwise direction, aiding the spring 56 in causing the end 55 of the band 54 to engage or wrap around the ring gear 51. Accordingly, for reversal of the motor 11, movement of the ring gear 51, after an initial small increment, is immediately prevented, and the gears 35 are again caused to rotate in planetary fashion. The driven member 18 thus may substantially immediately be moved toward the other limiting position. The projection 83 immediately permits the bracket 60 to move the counterclockwisemost end 57 back into engagement with the ring 51 through the spring 58.

The friction band 54 releases the load upon movement of the driven member 18 to its counterclockwise position in a manner symmetrically identical to that described in connection with its counterclockwise movement.

For either limiting position, the mechanism releases the load only for that direction of rotation of the gear structures that was required to bring the load to its then limiting position. Thus, the mechanism can be immediately reversed, even though it is in unclutching relationship for its obverse direction of movement.

Referring particularly to Fig. 4, a pair of spring pressed plungers 86 and 87 engage on opposite sides of the lower arm 77, normally maintaining the abutment 71 in a central position. In such intermediate position, the abutments 83 and 85 are not in engagement with either of the brackets 59 or 60.

The plunger 86 is carried by a hollow body member 88 that is threadedly accommodated in an appropriate aperture 89 of the casing 19. A spring 90 urges the plunger 86 to its outwardmost position in the body 88. The plunger 87 is accommodated in a hollow body member 91 that is threadedly accommodated in an appropriate recess 92 of the body member. A spring 93 in the hollow body 91 urges the plunger 87 to its limiting outward position. In the position shown in Fig. 4, the plunger 87 has been moved inwardly of the body by engagement therewith of the lower arm 77.

The springs 56 and 58 always urge the band 54 to engaged position except when the driven member is in a limiting position. Accordingly, rotation can be imparted to the driven member 18 for either direction of rotation. Furthermore, the valve can be operated in an intermittent manner, and by increments in either direction. The mechanism immediately responds to the direction of energization of the motor 11. A cycling function, which is time consuming, is obviated.

Immediately before arrival of the driven member 18 to either limiting position, the motor 11 is deenergized. For this purpose, there are provided a pair of symmetrically disposed circuit controllers, such as microswitches. One such microswitch 101 is illustrated in Fig. 2. The microswitch 101 is fastened, by the aid of screws 102, to a lower surface 103, formed in the motor base member 24. The screws 102 also attach a U-shaped bracket 105 accommodating the connections for the microswitches. The microswitch 101 is provided with a plunger head 106, which is urged inwardly to open the motor support.

In order to operate the plunger 106 and the corresponding plunger for the other microswitch upon reaching the limiting positions, respectively, use is made of a switch actuator mechanism carried by the upper leg 77 of the abutment member 71. The switch actuator member proper is supported directly on top of the leg 77, and it includes a base portion 107 of thin metal resting directly on the leg 77 and held thereto by suitable fastening means. This base portion 107 passes between the bushing 74 and the upper leg and, together with the bushing 74, restrains the abutment 71 against upward movement.

A pair of flexible resilient arms 108 are integrally formed with the base 107. These arms 108 extend between the microswitches. A resilient cross-pin 109 is also formed integrally with the base 107. It rises vertically from the edge of the base 107 and extends transversely beneath the arms 108. It is provided with a wide slot, the side surfaces of which restrain the arms 108 against separating movement while permitting the arms 108 to approach each other when a transverse force is applied to either of these arms.

The plunger 106 of the microswitch 101 and the corresponding plunger for the other microswitch are engaged by the arms 108 immediately preceding the arrival of the driven member 18 to counterclockwisemost or clockwisemost position thereof. The circuit portions with which the switches respectively cooperate may be parallel branches that are selectively operable to energize the motor for one direction of rotation or the other. Thus, the microswitch 101 is in that circuit which permits energization of the motor to rotate it in a clockwise direction. Upon, or preferably immediately before, arrival of the driven member 18 to its clockwisemost position, the microswitch 101 interrupts the energization circuit of the motor. In such position, the other microswitch is in such condition as to permit energization of the motor to rotate it and the driven member 18 in a clockwise direction. The operation of the microswitches is similar upon movement of the driven member 18 to its counterclockwisemost position.

The inventor claims:

1. In a device of the character described: a differential transmission having a reversible rotary driving member, a driven member, and a rotary control member; said driven member being capable of being driven in only one direction by said driving member only upon restraint being imposed upon said control member to prevent rotation of said control member in one direction; said driven member being capable of being driven in the other direction by said driving member only upon restraint being imposed upon said control member to prevent rotation of said control member in the other direction; said control member having means forming a cylindrical surface rotatable about its axis with said control member; a flexible band engaging said surface for holding said control member against angular movement in both directions; means urging the ends of the band inwardly to maintain the band in effective holding relation; a movable abutment having opposite limits of movement and engageable with the driven member and moved thereby for providing respective limits to the movement of the driven member; means carried by the abutment moving one or the other of the ends of the band outwardly of the cylindrical surface upon arrival of said driven member to respective limiting positions; the movement of the band end outwardly acting to terminate transmission of a driving force to the driven member only in the direction in which the driven member is limited; said band holding the control member against movement in both directions when said driven member is in an intermediate position.

2. In combination: a reversible source of motion; a transmission operated by said source, and including a pair of driven members; one of said driven members being movable by said source in one direction only upon restraint being imposed upon the other driven member to prevent movement of said other driven member in a first direction; said one driven member being movable by said source in the other direction only upon restraint being imposed upon the other driven member to prevent movement of said other driven member in a second direction; means determining opposite limits of movement of said one driven member; first means restraining movement of said other driven member only in said first direction and permitting movement of said other driven member in said second direction for all positions of said other driven member; second means independent of said first means restraining movement of said other driven member only in said second direction and permitting movement of said other driven member in said first direction for all positions of said other driven member; means dependent upon the arrival of said one movable member to its limit of movement in one direction for releasing said first restraining means; and means dependent upon the arrival of said one movable member to its limit of movement in the other direction for releasing said second restraining means; said first restraining means being operable when said second restraining means is released and when said other driven member is moved in said second direction; said second restraining means being operable when said first restraining means is released and when said other driven member has moved in said first direction; both of said restraining means being operable throughout all intermediate positions of said one movable member.

3. In a device of the character described: a rotary driven member having an arcuate flange; a differential transmission cooperable with a reversible driving member for rotating said driven member and including a control member having a cylindrical surface; said driven member being capable of being driven in one direction upon restraint being imposed upon said control member to prevent rotation of said control member in one direction; said driven member being capable of being driven in the other direction upon restraint being imposed upon said control member to prevent rotation of said control member in the other direction; a flexible friction band engageable with said surface; resilient means cooperable with the band ends for urging said band ends into engagement with said surface; one band end being operable to prevent rotation of said control member in one direction, and the other band end being operable to prevent rotation of said control member in the other direction; and a pivoted abutment movable between opposite limiting positions, and having a first arm in the path of movement of the ends of said arcuate flange; means biasing the abutment to an intermediate position; said abutment having a second arm engageable with the band ends respectively upon movement of the abutment toward opposite limiting positions respectively; said second arm being engageable with said one band end to move said one band end out of engagement with said surface only when said abutment is moved toward one limiting position by said flange; said second arm being engageable with said other band end to move said other band end out of engagement with said surface only when said abutment is moved toward its other limiting position by said flange; said band ends engaging said surface for all intermediate positions of said abutment.

4. In a device of the character described: a rotary driven member having an arcuate flange; a ring gear in juxtaposed relationship to the flange; means supporting the ring gear for rotary movement; a planetary gear carried by the driven member and movable in planetary fashion upon restraint being imposed upon said ring gear to prevent said ring gear from rotating; said ring gear having a cylindrical surface; an arcuate friction band having ends spaced from each other and extending about said surface; resilient means urging the band ends into engagement with said surface for preventing rotation of said ring gear in both directions; a pivoted abutment having a pair of arms, one of which projects into the path of movement of said arcuate flange, and the other of which extends between the band ends; means determining opposite limits of movement of the abutment; and means biasing said abutment toward a position intermediate said limits in which said other abutment arm is located intermediate said band ends; said other abutment arm being respectively engageable with the band ends upon movement of said abutment by said flange toward the respective limits of movement of said abutment for moving the corresponding band end away from said surface; said band restraining movement of said ring gear from moving in both directions except when said abutment reaches its limits of movement.

References Cited in the file of this patent

UNITED STATES PATENTS

| | | |
|---|---|---|
| 1,325,010 | Evans | Dec. 16, 1919 |
| 1,330,790 | Dean | Feb. 17, 1920 |
| 1,699,653 | Bronander | Jan. 27, 1929 |
| 1,723,327 | Bronander | Aug. 6, 1929 |
| 1,847,867 | Dodge | Mar. 1, 1932 |
| 2,205,235 | Arnold et al. | June 18, 1940 |
| 2,484,364 | Whitledge | Oct. 11, 1949 |
| 2,547,475 | Larsen | Apr. 3, 1951 |